Nov. 4, 1958　　　T. L. FAWICK　　　2,858,682

FLEXIBLE SHAFT COUPLING

Filed Dec. 24, 1957

INVENTOR.
THOMAS L. FAWICK
BY Willard D. Eakin
ATTORNEY

United States Patent Office 2,858,682
Patented Nov. 4, 1958

2,858,682

FLEXIBLE SHAFT COUPLING

Thomas Levi Fawick, Cleveland, Ohio

Application December 24, 1957, Serial No. 705,046

2 Claims. (Cl. 64—15)

This invention relates to shaft couplings having flexibility for compensating axial offset and/or angular misalignment of the coupled shafts.

Its chief objects are to provide, in a coupling having circumferentially spaced C-shaped metal rings through which the torque is transmitted, rings of an improved form having the advantage of not excessively localizing pressure of the ring against the member from which it receives, or to which its transmits, the torque; to provide a transversely split ring of such shape that it will have substantially the same resistance to bending whatever its rotative position may be in relation to the members between which it transmits the torque; to provide that advantage in each ring of a set of rings mounted in side-by-side relation and acting substantially as a unit in the transmission of the torque, so that each ring will sustain approximately the same part of the load even though different rings have different rotative positions; and to provide a transversely split ring having a relatively large range of torque-cushioning deformation in the closing of a relatively narrow gap at the position of the split.

Of the accompanying drawings:

Fig. 1 is an elevation, with the upper part shown in axial section, of parts of a pair of axially presented shafts and, connecting them, a coupling embodying my invention in its preferred form.

Fig. 2 is a fragmentary view corresponding to Fig. 1 but on a larger scale.

Fig. 3 is a fragmentary section on line 3—3 of Fig. 1.

Fig. 4 is a section on line 4—4 of Fig. 3.

Fig. 5 is a sidewise elevation of one of the rings.

Fig. 6 is an edgewise elevation of the same.

The two coupled shafts are shown at 10 and 11. Secured upon them respectively are coupling hubs 12 and 13. Each hub is formed with a circumferentially spaced set of approximately semi-cylindrical notches or socket grooves 14, 14, Fig. 3, defined by intervening torque-transmitting teeth 15, 15. The outer face of each torque-transmitting tooth 15 of the hub member is curved in an axial direction, as at 16, about a center lying in the axis of rotation of the respective shaft. Each such face being also curved on the same radius circumferentially of the assembly, the face is of spherical-arc shape.

Each hub is formed also with a pair of spaced apart annular grooves on its outer face for respective snap-rings 17, 17 which hold in place respective spacer rings 18, 18.

Between the spacer rings 18, 18 of each pair is mounted, with but little tolerance, a set of resiliently compressible, transversely split or C-shaped, spring-metal rings 19, 19.

Surrounding each hub and the set of rings mounted upon it is a sleeve member, 20, 21, having an end closure ring 22 bolted to its outer end and surrounding, with substantial clearance, the respective hub member.

At their adjacent ends the two sleeves are formed with centering and attaching flanges 20a, 21a respectively, which are bolted together so that the sleeves 20 and 21 are joined as a single, rigid sleeve structure.

Each of the sleeves 20, 21 is internally formed with a circumferentially spaced set of approximately semi-cylindrical socket grooves 23, 23, which are defined by intervening torque-transmitting teeth 24, 24.

The resiliently compressible rings 19, 19 of each set extend into the socket grooves 23 respectively for torque-transmitting engagement with the teeth 24.

The inner end face of each tooth 24 can be of cylindrical-arc form. The spherical-arc form of the outer end faces of the hub's teeth 15 permits angular misalignment of the sleeve and the hub, and also permits such slight relative rotative movement of them as is incidental to the cushioning of the torque by the rings 19.

The transverse split of each of the rings 19 is shown at 19a. The split extends directly from the radially inner face of the ring to its radially outer face but is obliquely disposed as viewed radially of the ring, as is clearly shown in Fig. 6. It is produced by removal of such quantity of metal that when the ring is in unstrained condition the ring has a gap, of small but substantial width directly across the gap.

Because of the obliqueness of the gap the C-shaped ring has, at each side of the gap, a tapered end portion 19b, Fig. 6, which, because of the taper, is of decreasing stiffness toward its end.

Preferably each ring 19 is of rectangular cross-sectional shape except that each of its four annular corners preferably is beveled, as at 19c, 19c, for avoiding, as to the two radially outer corners, contact of a sharp, 90 degree, corner of the ring with the torque-transmitting teeth, 15, 24, of the hub and sleeve members.

In operation each ring is permitted to have spring action, by reason of the gap 19a, and the ring has resilient compressibility which is measured by the dimension of the gap in a direction that is circumferential with relation to the assembly, which dimension is greater than the width of the gap directly across the gap. Also, because of the decreasing stiffness of each end part 19b toward its end, its end does not bite into the adjacent tooth 15 or 24 in the transmission of the torque, even in case of misalignment of the sleeve and hub members.

Also, because of the obliqueness of the gap, the end portions 19b overlap each other circumferentially of the ring, with the narrower part of each opposite a wider part of the other, so that the torque-transmitting teeth have good bearing against the ring at all parts of the circle.

Also relatively high flexibility of the end portions 19b permits them, while sustaining substantial parts of the torque, to yield sufficiently to shift part of the torque load to the full-section portions of the ring, with a desirable graduation of effect, and consequently with less biting into the torque-transmitting teeth than occurs at the corners of a ring in which the gap extends directly across the ring. This is especially important when the rings are forced to slightly helical form by axial offset or angular misalignment of the shafts.

I claim:

1. A flexible shaft coupling comprising a hub member formed with a circumferentially spaced set of torque-transmitting teeth defining a circumferentially spaced set of socket grooves, a sleeve member formed with a circumferentially spaced set of torque-transmitting teeth defining a circumferentially spaced set of socket grooves, each groove of the hub member being at the circumferential position of a groove of the sleeve member and therewith defining a socket, and, mounted in each of the sockets, torque-transmitting and cushioning means comprising a set of C-shaped, transversely split, spring-metal rings arranged in side-by-side relation to one another, so that the set of rings is in effect a single, laminated unit, but with the respective rings acting as individual springs, the transverse split of the ring extending obliquely across the ring as seen in an edgewise view of the ring.

2. A coupling as defined in claim 1 in which each of the defined rings is of rectangular cross-sectional shape except that at least its two radially outer annular corners are beveled.

References Cited in the file of this patent
UNITED STATES PATENTS

| | | |
|---|---|---|
| 2,066,224 | Pielstick | Dec. 29, 1936 |
| 2,081,016 | Nibbs | May 18, 1937 |
| 2,119,678 | Lindner | June 7, 1938 |
| 2,453,383 | Rathman | Nov. 9, 1948 |